United States Patent [19]
Kawamoto

[11] Patent Number: 5,151,786
[45] Date of Patent: Sep. 29, 1992

[54] FIELD DECISION CORRECTION APPARATUS

[75] Inventor: Sigeharu Kawamoto, Yokohama, Japan

[73] Assignee: Matsushita Electric Industrial Co., Ltd., Japan

[21] Appl. No.: 711,132

[22] Filed: Jun. 6, 1991

[30] Foreign Application Priority Data

Jun. 21, 1990 [JP] Japan .................. 2-163326

[51] Int. Cl.⁵ .......................................... H04N 5/04
[52] U.S. Cl. .................................... 358/148; 358/152
[58] Field of Search ........................... 358/148–153

[56] References Cited

U.S. PATENT DOCUMENTS 3,634,623  1/1972  McMann, Jr. et al. ............ 358/152
4,611,228  9/1986  Machida et al. .................... 358/149

Primary Examiner—Victor R. Kostak
Attorney, Agent, or Firm—Mason, Fenwick & Lawrence

[57] ABSTRACT

In accordance with the present invention, a vertical synchronizing pulse is compared with output of a field decision circuit by using a frequency division circuit for exercising frequency division with a ratio of ½. Even if an error is caused in the field decision circuit, therefore, a field pulse every vertical synchronizing can be outputted accurately.

3 Claims, 2 Drawing Sheets

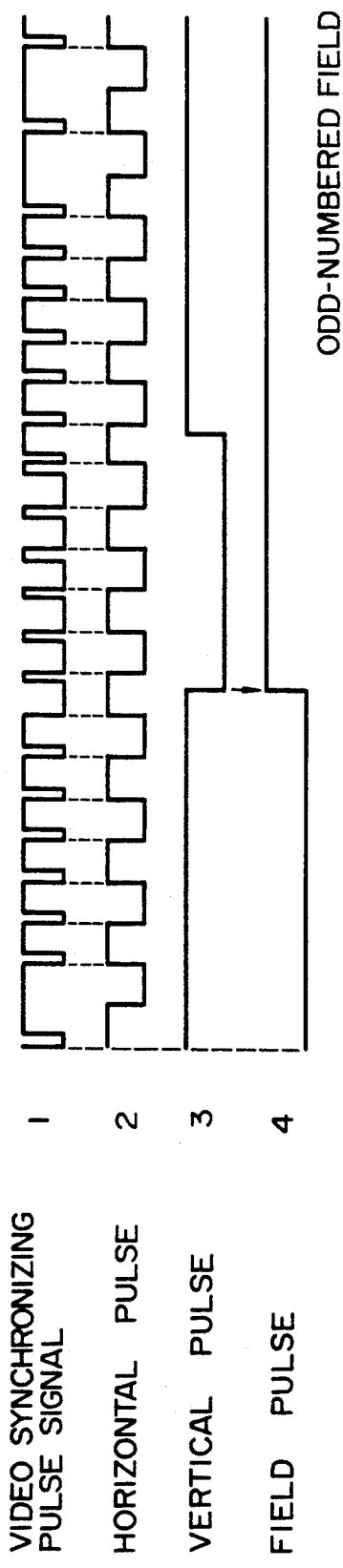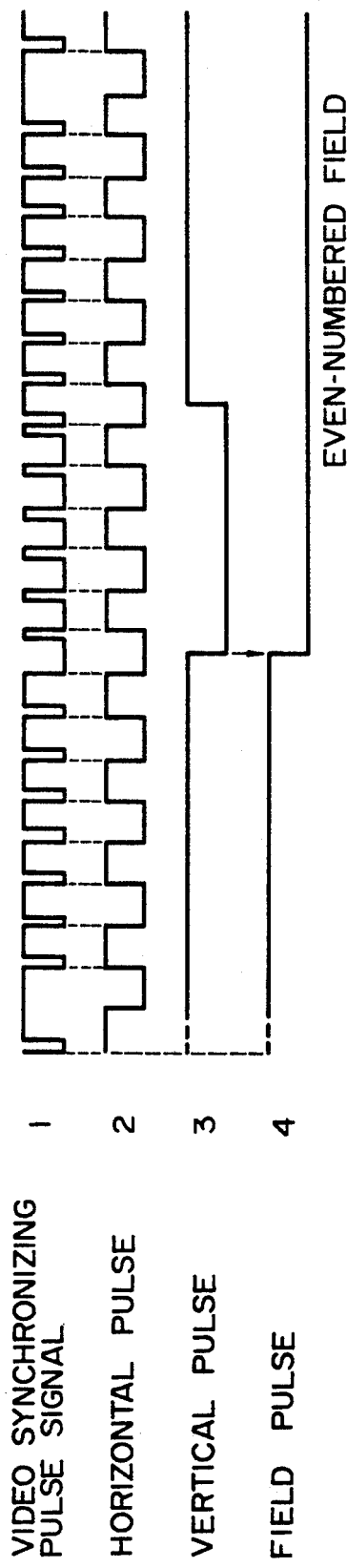

FIELD DECISION CORRECTION APPARATUS

BACKGROUND OF THE INVENTION

The present invention relates to a field decision correction apparatus used in video signal processing.

In video signal transmission of standard television system, a video synchronizing pulse signal comprising a horizontal synchronizing pulse, a vertical synchronizing signal and an equalizing pulse signal is inserted during a blanking interval of this video signal, and the video synchronizing pulse signal is separated from the video signal on the receiving side and a field decision is made to perform video signal processing.

Timing of field decision made by a field decision apparatus of the prior art will now be described by referring to FIGS. 2A and 2B.

With reference to FIGS. 2A and 2B, numeral 1 denotes a typical video synchronizing pulse signal, 2 a horizontal pulse produced from the above described video synchronizing pulse signal 1 by using a monostable multivibrator or the like to attain horizontal synchronization, and 3 a vertical pulse produced from the above described video synchronizing pulse signal 1 by using a monostable multivibrator or the like to attain vertical synchronization. Numeral 4 denotes a field pulse produced by decision made in a field decision apparatus of the prior art on the basis of the above described horizontal pulse 2 and vertical pulse 3.

The field decision apparatus of the prior art decides whether a field is odd-numbered or even-numbered by deciding whether the horizontal pulse 2 at a falling edge of the above described vertical pulse 3 is high or low and outputs the field pulse 4 which becomes a low level for an even field and which becomes a high level for an odd level.

In the above described video signal such as a video signal of special reproduction as in a household VTR (video tape recorder), uninterlaced information lacking in field information is inputted in some cases.

In this case, the result of the field decision is fixed to either of odd field and even field in the field decision apparatus of the prior art because of the lack of field information.

As a result, video signal processing which should be conducted repetitively on time in the order of odd field, even field, odd field,—is conducted for only either of odd and even fields. In a frame synchronizer, for example, field information is written into the memory of one of odd and even fields whereas information is not written at all into the memory of the other of odd and even field.

In reading out information from respective memories, information is read out alternately from the two memories. Therefore, a resultant image comprises an image successively changing read out from the memory in which new field information is written and a still image read out from the memory in which field information is not written. Thus two kinds of images are displayed. Regular images are not displayed, resulting in a problem.

SUMMARY OF THE INVENTION

The present invention solves the above described problem. An object of the present invention is to provide a field decision correction apparatus capable of correcting missing field information even when the field information is missing in a video signal and thereby reproducing a natural video signal.

In order to achieve the above described object, an apparatus according to the present invention is so configured as to comprise a field decision circuit for making a field decision on the basis of a horizontal pulse and a vertical pulse produced from a video synchronizing pulse signal, a frequency division circuit for exercising frequency division with a ratio of ½ upon the vertical pulse, a data flip-flop supplied with the result of decision from the field decision circuit on one of input terminals thereof and supplied with the output of the frequency division circuit via a delay circuit on the other of the input terminals thereof, and a selection circuit supplied with the output of the frequency division circuit via an inverter circuit on one of input terminals thereof and supplied directly with the output of the frequency division circuit on the other of the input terminals thereof to select and output either of those input signals on the basis of the output of the data flip-flop.

Even when field information in a video signal is missing, therefore, it is possible to correct the missing field information and reproduce a natural video signal owing to the above described configuration.

BRIEF DESCRIPTION OF THE DRAWINGS

FIGS. 2A and 2B are time charts showing operation timing of a field decision made by a field decision apparatus of the prior art.

DESCRIPTION OF THE PREFERRED EMBODIMENT

Figure 1:
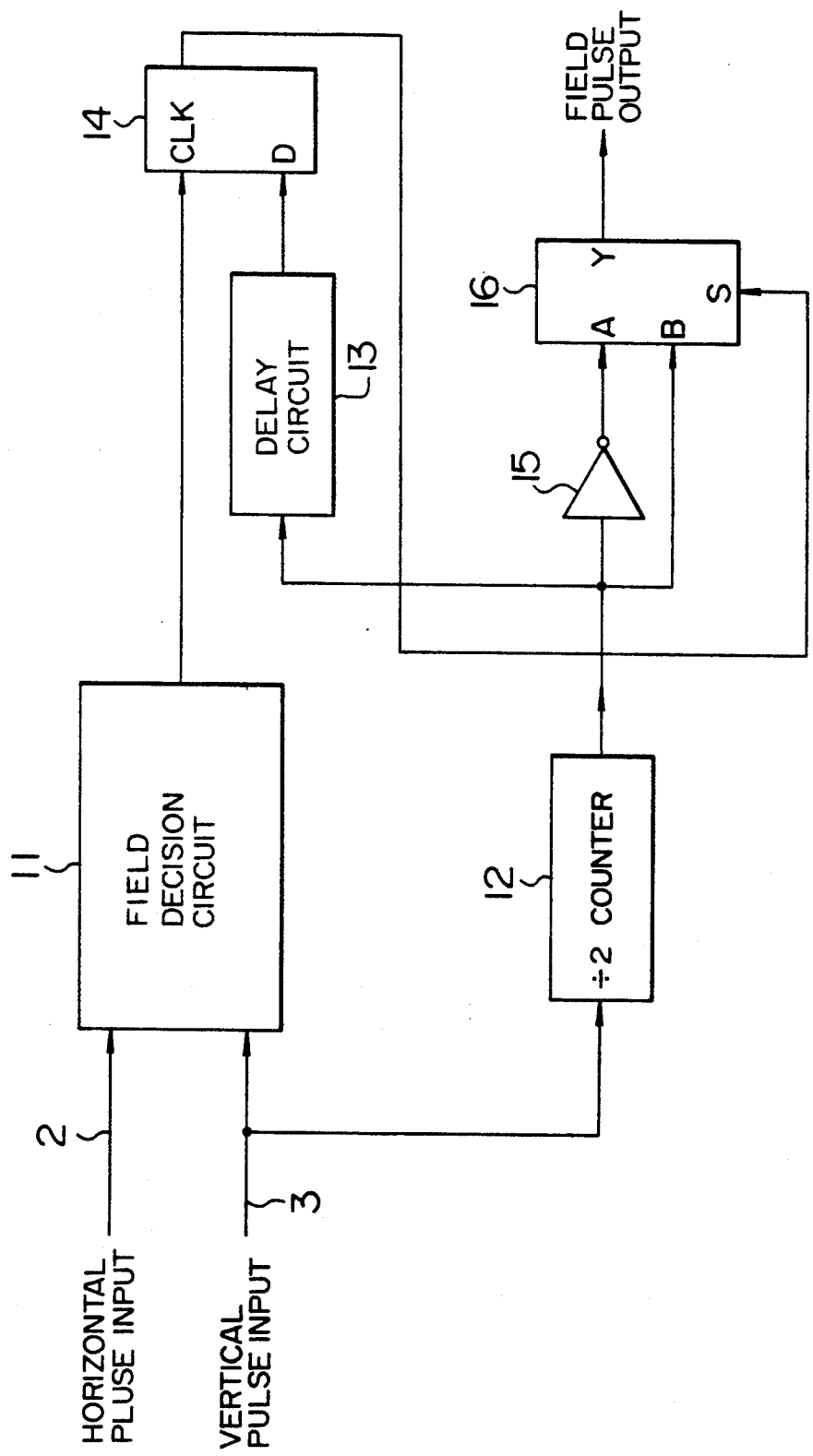
FIG. 1 is a block diagram showing the outline configuration of a field decision apparatus according to an embodiment of the present invention.

An embodiment of the present invention will hereinafter be described by referring to drawings. FIG. 1 is a block diagram showing the outline configuration of a field decision apparatus according to an embodiment of the present invention.

With reference to FIG. 1, numeral 11 denotes a field decision circuit supplied with the horizontal pulse 2 and the vertical pulse 3 produced from the video synchronizing pulse signal 1 as shown in FIGS. 2A and 2B. On the basis of the horizontal pulse 2 and the vertical pulse 3, the field decision circuit 11 makes a field decision similar to the field decision of the prior art.

That is to say, the output of the field decision circuit 11 depending upon the result of the above described field decision becomes a signal having a frequency equivalent to half of that of the vertical pulse 3 when field information is not missing. When field information is missing, the output of the field decision circuit 11 becomes a fixed signal having a high level or a low level.

Numeral 12 denotes a frequency division circuit for dividing the frequency of the vertical pulse 3 into half, 13 a delay circuit for delaying the vertical pulse 3 which has undergone frequency division in the frequency division circuit 12, and 14 a data flip-flop supplied with the output signal from the above described field decision circuit 11 on a terminal CLK thereof and supplied with the output of the above described delay circuit 13 on a terminal D thereof.

Numeral 15 denotes an inverter circuit supplied with the vertical pulse 3 which has undergone frequency division in the frequency division circuit 12. Numeral 6 denotes a selector supplied with the output signal of the inverter circuit 15 on a terminal A thereof, supplied with the output signal of the frequency division circuit 12 on a terminal B thereof, and supplied with the output signal of the flip-flop 14 on a terminal S thereof.

On the basis of the output signal of the data flip-flop 14 inputted to the terminal S, the selection circuit 16 selects either the frequency-divided vertical pulse 3 fed from the frequency division circuit 12 or its inverted signal and outputs it as the field pulse.

Operation of the present embodiment in the above described configuration will now be described by referring to FIG. 1.

When the horizontal pulse 2 and the vertical pulse 3 are inputted to the field decision correction apparatus of the present embodiment, the vertical pulse 3 is first inputted to the terminal D of the data flip-flop 14 after being frequency-divided in the frequency division circuit 12 and delayed in the delay circuit 13.

In parallel therewith, the vertical pulse 3 is inputted to the terminal A of the selection circuit 16 via the frequency division circuit 12 and the inverter circuit 15 in such a state that the vertical pulse is frequency-divided into half and inverted, and the vertical pulse 3 is inputted to the terminal B of the selection circuit 16 via the frequency division circuit 12 in such a state that the vertical pulse is frequency-divided into half and not inverted.

If the horizontal pulse 2 and the vertial pulse 3 are inputted to the field decision apparatus 11 in this state, a field decision is made on the basis of them. When field information is not missing, an output signal having a frequency equivalent to half of that of the vertical pulse 3 is inputted to the data flip-flop 14 by the field decision circuit 11.

According to a level change in this output signal, the data flip-flop 14 outputs the vertical pulse 3, which has been divided in frequency, delayed and inputted from the delay circuit 13 to the terminal D at that time, to the selector 16.

On the basis of the input signal fed from the data flip-flop 14, the selector 16 then selects a signal having the same polarity as that of the output signal of the data flip-flop 14, i.e., a signal having the same polarity as that of the output signal of the field decision circuit 11 out of non-inverted frequency-divided vertical pulse 3 and inverted frequency-divided vertical pulse 3 respectively inputted from the terminals A and B and outputs the selected signal as the field pulse.

When field information is not missing, a field pulse similar to that produced by the field decision of the prior art is obtained by the operation heretofore described.

When, on the contrary, field information is missing and hence the field is fixed, a fixed output signal having a high level or a low level is inputted to the data flip-flop 14 by the field decision circuit 11. Since the inputted output signal is a fixed signal, the data flip-flop 14 outputs the vertical pulse 3, which is frequency-divided, delayed, supplied from the delay circuit 13, and now held, to the selector 16.

On the basis of the input signal supplied from the data flip-flop 14, the selector 16 selects a signal having the same polarity as that of the output signal of the data flip-flop 14 out of the non-inverted frequency-divided vertical pulse 3 and inverted frequency-divided vertical pulse 3 respectively inputted from the terminals A and B and outputs the selected signal as the field pulse.

In case field information is missing, field pulse correction is thereby performed on the basis of field information obtained before the time of missing.

As described above, an apparatus according to the present invention is so configured as to comprise a field decision circuit for making a field decision on the basis of a horizontal pulse and a vertical pulse produced from a video synchronizing pulse signal, a frequency division circuit for exercising frequency division with a ratio of ½ upon the vertical pulse, a data flip-flop supplied with the result of decision from the field decision circuit on one of input terminals thereof and supplied with the output of the frequency division circuit via a delay circuit on the other of the input terminals thereof, and a selection circuit supplied with the output of the frequency division circuit via an inverter circuit on one of input terminals thereof and supplied directly with the output of the frequency division circuit on the other of the input terminals thereof to select and output either of those input signals on the basis of the output of the data flip-flop. Even when field information in a video signal is missing, therefore, it is possible to correct the missing field information and reproduce a natural video signal.

I claim:

1. A field decision correction apparatus comprising:
    a field decision circuit for providing as an output a field decision on the basis of a horizontal pulse and a vertical pulse, said horizontal pulse and said vertical pulse being video synchronizing pulses of a video signal;
    a frequency division circuit for dividing the frequency of said vertical pulse in half, and providing said divided frequency as in output;
    a flip-flop supplied with a decision from said field decision circuit on one of at least two input terminals thereof and supplied with the output of said frequency division circuit via a delay circuit on another of the at least two input terminals thereof; and
    a selection circuit supplied with the output of said frequency division circuit via an inverter circuit on one of at least two input terminals thereof and supplied directly with the output of said frequency division circuit on another of the at least two input terminals thereof to select and output either of those input signals on the basis of the output of said flip-flop.

2. A field decision correction apparatus according to claim 1, wherein said flip-flop comprises a data flip-flop.

3. A field decision correction apparatus according to claim 1, wherein said selection circuit comprises a two-input multiplexer.

* * * * *